(12) United States Patent
Chen et al.

(10) Patent No.: US 8,562,931 B2
(45) Date of Patent: Oct. 22, 2013

(54) METHOD FOR CYCLICALLY PREPARING MONOMER BORON AND COPRODUCING POTASSIUM CRYOLITE USING POTASSIUM FLUOBORATE AS INTERMEDIATE MATERIAL

(71) Applicant: Shenzhen Sunxing Light Alloys Materials Co., Ltd, Guangdong (CN)

(72) Inventors: Xuemin Chen, Guangdong (CN); Yueming Yu, Guangdong (CN); Qingdong Ye, Guangdong (CN); Jun Yang, Guangdong (CN); Zhi Zhou, Guangdong (CN)

(73) Assignee: Shenzhen Sunxing Light Alloys Materials Co., Ltd., Shenzhen (CN)

( * ) Notice: Subject to any disclaimer, the term of this patent is extended or adjusted under 35 U.S.C. 154(b) by 0 days.

(21) Appl. No.: 13/708,959

(22) Filed: Dec. 8, 2012

(65) Prior Publication Data

US 2013/0095023 A1   Apr. 18, 2013

(30) Foreign Application Priority Data

Feb. 24, 2012   (CN) .......................... 2012 1 0043683

(51) Int. Cl.
C01B 35/02   (2006.01)
(52) U.S. Cl.
USPC .......................................................... 423/298
(58) Field of Classification Search
None
See application file for complete search history.

(56) References Cited

U.S. PATENT DOCUMENTS 5,057,150 A * 10/1991 Reeve et al. .................... 75/671

FOREIGN PATENT DOCUMENTS

DE   2320360 A1 * 11/1974
RU   1806993 A  *  4/1993

OTHER PUBLICATIONS

SU1806993A (Apr. 1993, Korobitsyn et al.), English Translation.*
DE2320360A1 (Nov. 1974, Hellberg et al.), English Translation.*

* cited by examiner

Primary Examiner — Emily Le
Assistant Examiner — Anita Nassiri Motlagh
(74) Attorney, Agent, or Firm — Jackson IPG PLLC

(57) ABSTRACT

A method for cyclically preparing monomer boron and coproducing potassium cryolite using potassium fluoborate as an intermediate material, which includes following steps: A) adding hydrofluoric acid to boric acid or boron oxide to enable a reaction to form fluoboric acid; B) adding a potassium sulphate aqueous solution to the fluoboric acid to enable a reaction to form the potassium fluoborate; C) putting the potassium fluoborate into a reactor, adding aluminium to react with the potassium fluoborate to form the monomer boron and potassium cryolite; D) extracting the potassium cryolite, sending the potassium cryolite to a rotary reaction kettle together with concentrated sulphuric acid to enable a reaction to form hydrogen fluoride gas and aluminium potassium sulphate, potassium sulphate, collecting the hydrogen fluoride gas and dissolving it into water to obtain the hydrofluoric acid; E) recycling the obtained hydrofluoric acid to Step A to leach the boric acid or boron oxide.

3 Claims, 2 Drawing Sheets ically preparing monomer boron and coproducing potassium cryolite using potassium fluoborate as intermediate material.

TECHNICAL FIELD OF THE INVENTION

The disclosure relates to a method for preparing monomer boron, and in particular to a method for cyclically preparing the monomer boron and coproducing low-molecular-ratio potassium cryolite using potassium fluoborate as an intermediate material.

BACKGROUND OF THE INVENTION

Generally, there are two methods for producing element boron in industry.

(1) Magnesium reduction process, in which boric acid and magnesium powder are mainly taken as raw materials, the boric acid for industrial use is put in a stainless steel plate and then the stainless steel plate is put in a tube furnace to evenly heat to a temperature of 250 DEG C. under a pressure-reducing condition, so that the boric acid dehydrates to form boron oxide: $2H_3BO_3=B_2O_3+3H_2O$; then the boron oxide is crushed to 80 mesh and is fully mixed with the magnesium powder at the ratio of 3:1 (mass ratio); and then the mixture is put in a reaction tube to perform a reduction reaction at a temperature of between 850 and 900 DEG C. in the tube furnace under vacuum, so that the boron oxide is reduced to the element boron, wherein this reaction is a thermal reaction which can be finished quickly: $B_2O_3+3Mg=3MgO+2B$; the materials obtained after the reaction is finished are dipped in water for two days and then are boiled for 4 hours in hydrochloric acid so as to be free of impurities such as magnesium oxide, then the materials are washed off acid by water; in order to remove the impurities, it is necessary to repeat acid pickling and water washing for one time in the same condition, thus, boron powder with boron content of about 85% is obtained; in order to improve the quality of boron and to further remove magnesium, the boron powder above can be added to the boron oxide which is ten times the mass of the boron powder to be evenly mixed and heated to a temperature of between 800 and 850 DEG C. in the reaction furnace under vacuum and kept for 3 to 4 hours; then the material is taken out and washed off boron oxide by water; after processes of acid pickling and water washing again, the material is filtered and dried, thus, boron powder with boron content of over 90% is obtained.

(2) Aluminium reduction process, in which industrial borax is generally taken as a raw material and is put in a melting furnace of over 750 DEG C. at normal pressure to dehydrate 10 crystal water to form anhydride sodium tetraborate; after being cooled, coarse-crushed and fine-crushed, the anhydride sodium tetraborate is well mixed with sulphur and aluminium powder at a certain ratio, then the mixture is put in a cast-iron reaction furnace to perform a reaction at a high temperature: $Na_2B_4O_7+4Al=4B+Na_2Al_2O_4+Al_2O_3$; after being cooled, frits are taken out of the reaction furnace and are crushed first, then the crushed frits are dipped in hydrochloric acid and then in hydrofluoric acid, next, the crushed frits are washed by water and alkali (5 mass percent NaOH solution), finally, the crushed frits are wasted by water, separated and dried to obtain element boron.

The two methods above mainly have disadvantages of low yield rate and high preparation cost, and the content of the product obtained is less than 90%.

The method for preparing potassium fluoroaluminate (potassium cryolite) in industry generally adopts a synthesis method, in which anhydrous hydrofluoric acid reacts with aluminium hydroxide to form fluoaluminic acid; then the fluoaluminic acid reacts with potassium hydroxide at a high temperature; after processes of filtering, drying, melting and crushing, the potassium fluoroaluminate is prepared, wherein the reaction formula is as follows: $6HF+Al(OH)_3=AlF_3 \cdot 3HF+3H_2O$, $AlF_3 \cdot 3HF+3KOH=K_3AlF_6+3H_2O$; the potassium cryolite synthesized by this method has a relative molecular weight of 258.28, with a molecular formula of $AlF_3 \cdot mKF$ (m=3.0) and a melting point of between 560 and 580 DEG C.; the potassium cryolite synthesized by the industrial synthesis method generally has a molecular ratio of m=2.0-3.0, and it is difficult to obtain the relatively pure potassium cryolite of a low molecular weight with a molecular ratio of m=1.0-1.5.

SUMMARY OF THE INVENTION

In order to solve the problem how to prepare relatively pure potassium cryolite with a low molecular ratio massively and industrially, so as to meet the requirement of the low-temperature aluminium electrolysis industry on electrolyte, the inventor has done a great deal of research in the selection of intermediate material and the circular process of coproduct and unexpectedly finds that the potassium cryolite of a low molecular weight with a molecular ratio of m=1.0 can be produced while monomer boron is produced by a thermochemical sulphate reduction process with potassium fluoborate as an intermediate material; moreover, if a chemical reaction is further performed on the potassium cryolite, the monomer boron can be cyclically produced. The disclosure has a simple process; compared with the conventional popular preparation method, the disclosure achieves a lower cost; the product obtained is of high quality and can be cyclically used, thus the product efficiency is improved and the pollution to environment is reduced.

The disclosure provides a method for cyclically preparing monomer boron and coproducing potassium cryolite using potassium fluoborate as an intermediate material, which includes the following steps:

A) adding hydrofluoric acid to boric acid or boron oxide to enable a reaction at a temperature of between 100 and 200 DEG C. to form fluoboric acid, wherein the reaction formula involved is: $H_3BO_3+4HF=HBF_4+3H_2O$, $B_2O_3+8H=2HBF_4+3H_2O$;

B) adding a potassium sulphate aqueous solution to the fluoboric acid to enable a reaction to form a potassium fluoborate precipitate, centrifuging and rinsing the potassium fluoborate precipitate to obtain the intermediate material potassium fluoborate, wherein the reaction formula involved is:

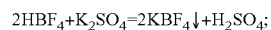

$2HBF_4+K_2SO_4=2KBF_4\downarrow+H_2SO_4;$

C) putting dried potassium fluoborate into a reactor, injecting an inert gas to the reactor after vacuumizing, heating the reactor to a temperature of between 700 and 800 DEG C., adding aluminium in the reactor and stirring quickly to enable a reaction for 4 to 6 hours to form monomer boron and potassium cryolite, or, putting the aluminium into the reactor, injecting an inert gas to the reactor after vacuumizing, heating the reactor to the temperature of between 700 and 800 DEG C., adding dried and flowable potassium fluoborate in the reactor and stirring quickly to enable a reaction for 4 to 6 hours to form the monomer boron and potassium cryolite, wherein the reaction formula involved is: $KBF_4+Al=B+AlF_3.KF$;

D) extracting molten liquid potassium cryolite; after the molten liquid potassium cryolite is cooled, crushing and sending it to a rotary reaction kettle quantificationally together with concentrated sulphuric acid to enable a reaction at a temperature of between 400 and 500 DEG C. to form hydrogen fluoride gas and aluminium potassium sulphate, potassium sulphate; collecting the hydrogen fluoride gas and dissolving it into water to obtain a hydrofluoric acid aqueous solution; reacting the mixture of the aluminium potassium sulphate and the potassium sulphate with an aqueous solution of potassium hydroxide after crushing the mixture of the aluminium potassium sulphate and the potassium sulphate, and obtaining the aqueous solution of potassium sulphate after separating out the solid aluminium hydroxide, wherein the reaction formula involved is: $AlF_3.KF+2H_2SO_4=4HF\uparrow+KAl(SO_4)_2$, $KAl(SO_4)_2 3KOH=2K_2SO_4+Al(OH)_3\downarrow$;

E) recycling the obtained hydrofluoric acid aqueous solution and the aqueous solution of potassium sulphate to the front end to leach the boric acid or boron oxide, so as to achieve the purpose of cyclically preparing the intermediate material potassium fluoborate.

The technical scheme above achieves the purposes as follows: the disclosure provides a method for preparing a low-temperature aluminium electrolyte (potassium cryolite) with a low molecular ratio, of which the molecular weight is 142, and provides a method for cyclically extracting and using the element boron in the potassium cryolite so as to protect underground fluorite resources, wherein the coproduct potassium cryolite has a good application prospect and can be recycled; compared with the conventional method for preparing monomer boron, the disclosure has a simple and short process, a low comprehensive cost of production, a high production efficiency and a low pollution to environment.

As a further improvement of the disclosure, in Step C, the aluminium is molten aluminium which is added in the reactor in a dripping way, or the aluminium is added in the reactor first and then dried potassium fluoborate is batch-fed in the reactor after the aluminium is molten, wherein the completeness of this reaction can be greater than or equal to 95%.

As a further improvement of the disclosure, in Step C, the inert gas is argon.

Compared with the conventional art, the disclosure achieves advantages as follows: the disclosure provides a method for preparing potassium cryolite of a low molecular weight with a low molecular ratio of m=1.0, which is suitable for massive industrial production, so as to meet the requirement of the low-temperature aluminium electrolysis industry on electrolyte; the disclosure produces the monomer boron simultaneously, and compared with the conventional art has a simple preparation process, a high product yield and has the boron content greater than 90%; moreover, the boron can be used as an intermediate material for producing various borides and boron metal alloys. Meanwhile, since the element fluorine in the potassium cryolite can be cyclically extracted, the life of fluorite resources can be prolonged and the pollution to environment is reduced.

DETAILED DESCRIPTION OF THE EMBODIMENTS

Figure 1:
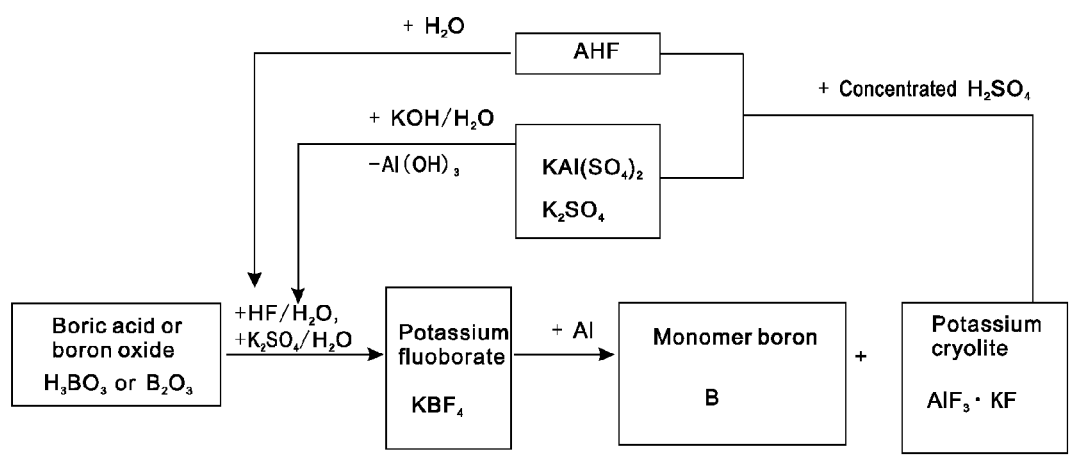
FIG. 1 shows a process route chart of preparing monomer boron and potassium cryolite according to the disclosure.
Figure 2:
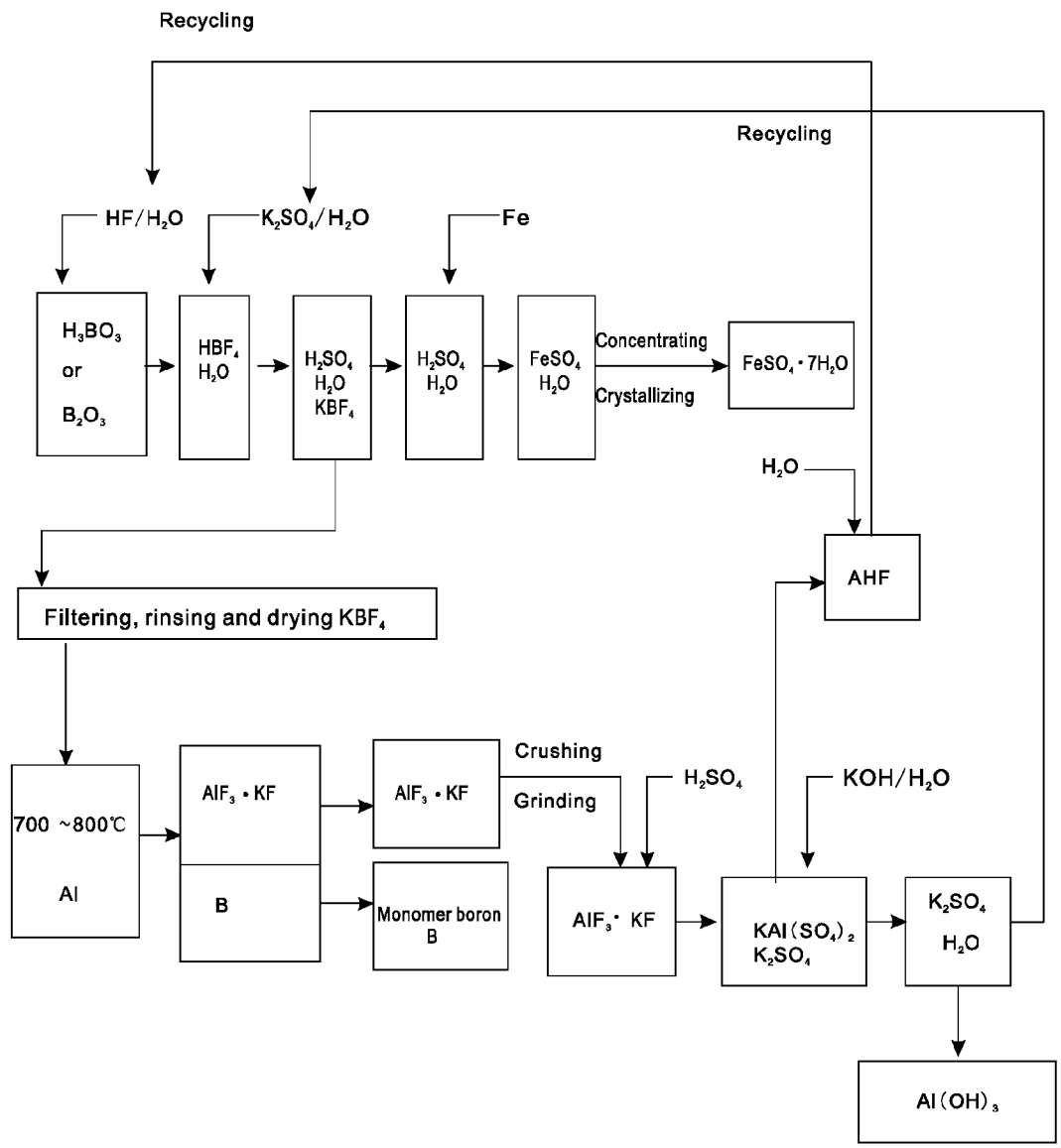
FIG. 2 shows a process flowchart of preparing monomer boron and potassium cryolite according to the disclosure.

The disclosure is described below in further detail through specific embodiments.

Embodiment 1

Putting 0.62 tons of boric acid and 0.35 tons of boron oxide into a reaction kettle; adding 4 tons of 20% (mass percent) hydrofluoric acid in the reaction kettle to react with the boric acid or boron oxide at a temperature of 100 DEG C. to form fluoboric acid; adding 3 tons of 30% (mass percent) potassium sulphate aqueous solution to the fluoboric acid to enable a reaction to form a potassium fluoborate precipitate; centrifuging, rinsing and drying the potassium fluoborate precipitate to obtain 1.12 tons of intermediate material potassium fluoborate; putting the 1.12 tons of dried potassium fluoborate into another reactor, injecting an inert gas to the reactor after vacuumizing, heating the reactor to a temperature of 700 DEG C., dripping molten aluminium into the reactor slowly in accordance with a reaction ratio and stirring quickly, wherein the materials are completely reacted after 5 hours and monomer boron and potassium cryolite are generated; extracting molten liquid potassium cryolite; crushing the molten liquid potassium cryolite after it is cooled, weighing and sending it to a rotary reaction kettle quantitatively together with concentrated sulphuric acid which is added in accordance with a reaction ratio, reacting the potassium cryolite with the concentrated sulphuric acid at a temperature of between 400 and 500 DEG C. to form hydrogen fluoride gas and aluminium potassium sulphate, potassium sulphate; collecting the hydrogen fluoride gas and dissolving it into water to obtain a hydrofluoric acid aqueous solution; reacting the aluminium potassium sulphate, the potassium sulphate with an aqueous solution of potassium hydroxide after crushing the aluminium potassium sulphate and the potassium sulphate, and obtaining the potassium sulphate aqueous solution after separating out the solid aluminium hydroxide, wherein the obtained hydrofluoric acid aqueous solution and the potassium sulphate aqueous solution can be recycled to the front end to leach the boric acid or boron oxide, so as to achieve the purpose of cyclically preparing the intermediate material potassium fluoborate.

Embodiment 2

Putting 0.62 tons of boric acid and 0.35 tons of boron oxide into a reaction kettle; adding 4 tons of 20% (mass percent) hydrofluoric acid in the reaction kettle to react with the boric acid or boron oxide at a temperature of 100 DEG C. to form fluoboric acid; adding 3 tons of 30% (mass percent) potassium sulphate aqueous solution to the fluoboric acid to enable a reaction to form a potassium fluoborate precipitate; centrifuging, rinsing and drying the potassium fluoborate precipitate to obtain 1.12 tons of intermediate material potassium fluoborate; weighing aluminium in accordance with a reaction ratio and putting the aluminium into another reactor, injecting an inert gas to the reactor after vacuumizing, heating the reactor to a temperature of 700 DEG C., adding the 1.12 tons of dried and flowable potassium fluoborate in the reactor in a measurable flowing way and stirring quickly, wherein the materials are completely reacted after 5 hours and monomer boron and potassium cryolite are generated; extracting molten liquid potassium cryolite; crushing the molten liquid potassium cryolite after it is cooled, weighing and sending it to a rotary reaction kettle quantitatively together with concentrated sulphuric acid which is added in accordance with a reaction ratio, reacting the potassium cryolite with the concentrated sulphuric acid at a temperature of between 400 and 500 DEG C. to form hydrogen fluoride gas and aluminium potassium sulphate, potassium sulphate; collecting the hydrogen fluoride gas and dissolving it into water to obtain hydrofluoric acid; reacting the mixture of the aluminium potassium sulphate and the potassium sulphate with an aqueous solution of potassium hydroxide after crushing the mixture of the aluminium potassium sulphate and the potassium sulphate, and obtaining the potassium sulphate aqueous solution after separating out the solid aluminium hydroxide, wherein the obtained hydrofluoric acid aqueous solution and the potassium sulphate aqueous solution can be recycled to the front end to leach the boric acid or boron oxide, so as to achieve the purpose of cyclically preparing the intermediate material potassium fluoborate.

The above are the further detailed description of the disclosure made in conjunction with specific preferred embodiments; it can not be considered that the specific embodiment of the disclosure is only limited to the description above. For the common technicians in the technical field of the disclosure, umpty simple deductions or substitutes can be made without departing from the concept of the disclosure and they are deemed to be included within the scope of protection of the disclosure.

What is claimed is:

1. A method for cyclically preparing monomer boron and coproducing potassium cryolite using potassium fluoborate as an intermediate material, including the following steps:
   A) adding hydrofluoric acid to boric acid or boron oxide to enable a reaction at a temperature of between 100 and 200 DEG C. to form fluoboric acid;
   B) adding a potassium sulphate aqueous solution to the fluoboric acid to enable a reaction to form a potassium fluoborate precipitate, centrifuging and rinsing the potassium fluoborate precipitate to obtain the intermediate material potassium fluoborate;
   C) putting dried potassium fluoborate into a reactor, injecting an inert gas to the reactor after vacuumizing, heating the reactor to a temperature of between 700 and 800 DEG C., adding aluminium in the reactor and stirring quickly to enable a reaction for 4 to 6 hours to form the monomer boron and potassium cryolite, or, putting the aluminium into the reactor, injecting an inert gas to the reactor after vacuumizing, heating the reactor to the temperature of between 700 and 800 DEG C., adding dried and flowable potassium fluoborate in the reactor and stirring quickly to enable a reaction for 4 to 6 hours to form the monomer boron and potassium cryolite;
   D) extracting molten liquid potassium cryolite; after the molten liquid potassium cryolite is cooled, crushing and sending it to a rotary reaction kettle quantificationally together with concentrated sulphuric acid to enable a reaction at a temperature of between 400 and 500 DEG C. to form hydrogen fluoride gas and aluminium potassium sulphate, potassium sulphate; collecting the hydrogen fluoride gas and dissolving it into water to obtain a hydrofluoric acid aqueous solution; reacting the aluminium potassium sulphate with an aqueous solution of potassium hydroxide after crushing the aluminium potassium sulphate, and obtaining the aqueous solution of potassium sulphate after separating out the solid aluminium hydroxide; and
   E) recycling the obtained hydrofluoric acid aqueous solution and the aqueous solution of potassium sulphate to the front end to leach the boric acid or boron oxide, so as to achieve the purpose of cyclically preparing the intermediate material potassium fluoborate.

2. The method for cyclically preparing monomer boron and coproducing potassium cryolite using potassium fluoborate as an intermediate material according to claim 1, wherein in Step C, the aluminium is molten aluminium which is added in the reactor in a dripping way or the dried and flowable potassium fluoborate is added in the reactor in a measurable flowing way.

3. The method for cyclically preparing monomer boron and coproducing potassium cryolite using potassium fluoborate as an intermediate material according to claim 1, wherein in Step C, the inert gas is argon.

* * * * *